(12) United States Patent
Mori et al.

(10) Patent No.: US 7,141,181 B2
(45) Date of Patent: Nov. 28, 2006

(54) COMPOSITION COMPRISING AMPHOTERIC POLYMERIC FLOCCULANTS

(75) Inventors: Yoshio Mori, Aichi (JP); Koichi Adachi, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 83 days.

(21) Appl. No.: 10/487,918

(22) PCT Filed: Sep. 4, 2002

(86) PCT No.: PCT/JP02/08974
§ 371 (c)(1), (2), (4) Date: Feb. 27, 2004

(87) PCT Pub. No.: WO03/020829
PCT Pub. Date: Mar. 13, 2003

(65) Prior Publication Data
US 2004/0238454 A1  Dec. 2, 2004

(30) Foreign Application Priority Data
Sep. 4, 2001 (JP) ............... 2001-268001
Oct. 11, 2001 (JP) ............... 2001-314507

(51) Int. Cl.
C02F 1/56 (2006.01)
D21H 21/10 (2006.01)
(52) U.S. Cl. ............... 252/180; 162/168.2; 162/168.3; 210/728; 524/922
(58) Field of Classification Search ............... 252/180
See application file for complete search history.

(56) References Cited

U.S. PATENT DOCUMENTS

| | | | | |
|---|---|---|---|---|
| 3,639,208 A | * | 2/1972 | Varveri et al. | 162/168.4 |
| 5,252,184 A | * | 10/1993 | Tanaka et al. | 162/168.2 |
| 5,284,909 A | * | 2/1994 | Takahashi et al. | 524/801 |
| 5,403,883 A | | 4/1995 | Messener et al. | |
| 5,883,181 A | * | 3/1999 | Cicchiello et al. | 524/521 |
| 5,961,838 A | * | 10/1999 | Braden et al. | 210/728 |
| 6,001,920 A | * | 12/1999 | Ghafoor et al. | 524/500 |
| 6,103,064 A | * | 8/2000 | Asplund et al. | 162/168.3 |
| 6,225,395 B1 | | 5/2001 | Nzudie et al. | |
| 6,358,364 B1 | * | 3/2002 | Keiser et al. | 162/181.6 |
| 6,407,161 B1 | * | 6/2002 | Dungworth | 524/801 |
| 6,485,651 B1 | * | 11/2002 | Branning | 210/702 |
| 2003/0178371 A1 | * | 9/2003 | Norman et al. | 210/723 |

FOREIGN PATENT DOCUMENTS

| | | | |
|---|---|---|---|
| JP | 63-158200 A | | 7/1988 |
| JP | 63-252600 A | | 10/1988 |
| JP | 02-031899 A | | 2/1990 |
| JP | 02-180700 A | | 7/1990 |
| JP | 04-281095 A | | 10/1992 |
| JP | 06-088030 A | | 3/1994 |
| JP | 06-134213 A | | 5/1994 |
| JP | 08-112504 A | | 5/1996 |
| JP | 10000500 A | * | 1/1998 |
| JP | 2899034 B2 | | 3/1999 |
| JP | 2945761 B2 | | 6/1999 |

* cited by examiner

Primary Examiner—Peter A. Hruskoci
(74) Attorney, Agent, or Firm—Fitch, Even, Tabin & Flannery

(57) ABSTRACT

A composition is provided which comprises amphoteric polymers comprising, as constituent monomer units, a cationic monomer unit, an anionic monomer unit, and optionally a nonionic monomer unit and having a 0.5% salted viscosity of 10 to 120 mPa·s, wherein said amphoteric polymers comprise a first amphoteric polymer satisfying the following expression (1) and a second amphoteric polymer satisfying the following expression (2) or a third amphoteric polymer satisfying the following expressions (3) and (4):

$$Ca_1/An_1 \geq 1 \tag{1}$$

$$Ca_2/An_2 < 1 \tag{2}$$

$$Ca_3/An_3 \geq 1 \tag{3}$$

$$|(Ca_1-An_1)-(Ca_3-An_3)| \geq 1.5 \tag{4}$$

wherein $Ca_1$ and $An_1$ respectively represent the total mole number of the cationic monomer units and the total mole number of the anionic monomer units in the first amphoteric polymer on a condition that the total mole number of all the constituent monomer units in the first amphoteric polymer is converted to be 100 mol; on a condition similar to the above, $Ca_2$ and $An_2$, and $Ca_3$ and $An_3$, respectively represent the total mole number of the cationic monomer units and the total mole number of the anionic monomer units in the second and third amphoteric polymers. The composition is excellent in various flocculation and dewatering performances for various types of sludge, in particular, for sludge high in ratio of excess sludge, and can be used for process yield improvement in papermaking process.

7 Claims, No Drawings

COMPOSITION COMPRISING AMPHOTERIC POLYMERIC FLOCCULANTS

CROSS-REFERENCED APPLICATION(S)

This application is the National Stage of International Application PCT/JP02/08974, filed Sep. 4, 2002, the complete disclosure of which is incorporated herein by reference, which designated the U.S. and that International Application was not published under PCT Article 21(2) in English.

TECHNICAL FIELD

The present invention relates to a composition and an amphoteric polymer flocculant excellent in various flocculation and dewatering properties such that the composition and flocculant are excellent in flocculability and dewaterability, are high in filterability, and yield good flocs. It also relates to their uses for dewatering sludge, for retention aid in papermaking, and for others.

BACKGROUND ART

Conventionally, cationic polymer flocculants have been used alone for dewatering treatment of sludge; however, in these years, with increase in amount of generated sludge and deterioration of characteristics of the sludge, the sludge is not satisfactorily treated by conventional cationic polymer flocculants because they are still insufficient in capacity for treating the sludge, moisture content of dewatered sludge cake, SS recovery rate, peelability of dewatered sludge cake from filter cloth, or the like; thus there has been a demand for improving these problems.

For the purpose of improving these defects of the conventional cationic polymer flocculants, various amphoteric polymer flocculants and various dewatering methods by use thereof have been proposed.

For example, the following methods have been known: (1) a method of dewatering sludge in which a specific ionic-equivalent cationic-rich amphoteric polymer flocculant is added to an organic sludge that does not contain any inorganic sludge but is supplemented with an inorganic flocculant at a pH of 5 to 8 (Japanese Patent Publication (Kokoku) No. 5-56199), (2) a method of dewatering sludge in which an acrylate based cationic polymer flocculant and an amphoteric polymer flocculant are added in combination to organic sludge having a pH of 5 to 8 (Japanese Patent No. 2933627), (3) a dewatering method in which an inorganic flocculant is added to sludge to adjust the pH to be less than 5 and then a specific composition of anionic-rich amphoteric polymer flocculant is added (Japanese Patent Publication (Kokoku) No. 6-239), and (4) a treatment method of waste water of organic nature, in which an inorganic flocculant, an anionic polymer flocculant and a cationic-rich amphoteric polymer flocculant are successively added to the waste water (Japanese Patent Laid-Open No.6-134213).

The above described dewatering methods (1) to (4) have their respective advantages; however, these methods cannot necessarily be said to be effective against the tendency for recent waste water to become hard to be dewatered.

More specifically, since the COD value after treatment of waste water has been required to be lowered, proportion of activated sludge to be treated per the whole waste water has become higher. Namely, the sludge subjected to the dewatering treatment has become higher in content of excess sludge. Also, in case of waste water resulting from papermaking, recovery rate of fibrous contents from the waste water is increased whilst fibrous contents in the sludge are lowered, and thus several cases have occurred to which conventional polymer flocculants and dewatering methods cannot be applied.

Meanwhile, in papermaking processes, when or after a filler-containing stuff is diluted to a final concentration for feeding into a papermaking machine, a retention aid is added thereto so that the filler is prevented from flowing from the papermaking machine to whitewater, thereby improving the process yield.

As the retention aid, water-soluble high-molecular-weight cationic polymers are usually used, which include, for example, cationic acrylamide based polymers, partially hydrolyzed products thereof, Mannich modification products thereof, and the like. Recently, the following methods have been noticed: a method for improving retention in paper making process in which a cationic polymer is added to a stuff, and then bentonite is added thereto (Japanese Patent Laid-Open No.4-281095) and a method in which an acrylamide based polymer and an anionic aluminum-containing silica sol are added in combination to the stuff (Japanese Patent No. 2945761). The acrylamide based polymer as used above is produced by aqueous solution polymerization or the like with solid content of monomers being set at 10 to 40% by mass, and the polymer obtained by the aqueous solution polymerization is usually in a form of highly viscous paste. Accordingly, when used as a retention aid, the polymer paste is diluted with water so as to be used as an aqueous solution of 0.1 to 0.5% by mass.

The retention aid is essentially different in timing of addition in the papermaking process and molecular weight of useful polymers from paper strength agents that are used for the purpose of enhancing bonding strength between pulp fibers, and accordingly increasing the strength to rupture, stretch and the like. More specifically, as for the timing of addition, the paper strength agent is added after a sizing reagent such as aluminum sulfate has been added to the stuff, while the retention aid is required to be added immediately before the stuff is fed to a papermaking machine so that flocs of the pulp slurry may not be destroyed. As for the molecular weight of useful polymers, the paper strength agent has a molecular weight of hundreds of thousands, while the molecular weight of the retention aid exceeds one million, and otherwise sufficient retention improvement cannot be attained. Because of such a high molecular weight, addition amount of the retention aid ranges from 0.01 to 0.05% by mass in relation to the pulp, which is a very small amount compared to that of the strength agent which ranges from 0.1 to 0.5% by mass. As can be seen from the above described characteristics, the retention aid is required to have characteristics close to those of the flocculants used in the waste water treatment.

The retention aid is a polymer with a molecular weight exceeding one million as described above, and thus is obtained, after polymerization, as a water-containing polymer in a form that is pasty and extremely low in solubility in water, thereby causing a problem such that an extremely long time is required to completely dilute it for use as an aqueous solution in the actual papermaking process.

Furthermore, conventional retention aids are insufficient in retention, and have significant defects on alkaline papermaking. In these years, the papermaking process is promoted to change to a closed system, and accordingly the recycled water and pulp fibers are contaminated with large amounts of water-soluble inorganic matters and others originating from the fillers so that the conventional retention aids are insufficient in retention.

The present inventors have made intensive researches for the purpose of finding out a composition, a polymer flocculant and a dewatering method, which are excellent in performance of flocculation and dewatering of various types of sludge, in particular, sludge large in proportion of waste sludge, and also finding out a retention aid excellent in solubility in water and in retention in the papermaking process.

DISCLOSURE OF INVENTION

As a result of various investigations for the purpose of solving the above described problems, the present inventors have completed the present invention by finding out that a composition containing amphoteric polymers of two or more types that are different from one another in copolymerization ratio of cationic monomer units to anionic monomer units, is effective.

Hereinafter, the present invention will be described in detail.

It should be noted that, in the present specification, (meth)acrylate denotes acrylate or methacrylate, (meth)acrylamide denotes acrylamide or methacrylamide, and (meth)acrylic acid denotes acrylic acid or methacrylic acid.

1. Composition

The amphoteric polymers constituting the composition of the present invention may be any copolymer which contains a cationic monomer unit and an anionic monomer unit as indispensable constituent monomer units.

The cationic monomer includes tertiary salts. exemplified by hydrochlorides and sulfates of dialkylaminoalkyl (meth)acrylates such as dimethylaminoethyl (meth)acrylate, diethylaminoethyl (meth)acrylate, and diethylamino-2-hydroxypropyl (meth)acrylate; quaternary salts exemplified by alkyl halide adducts such as methyl chloride adducts of dialkylaminoalkyl (meth)acrylates, and aryl halide adducts such as benzyl chloride adducts of dialkylaminoalkyl (meth)acrylates; tertiary salts exemplified by hydrochlorides and sulfates of dialkyl (meth)acrylamides such as N,N-dimethyl (meth)acrylamide; and quaternary salts exemplified by alkyl halide adducts such as methyl chloride adducts of dialkyl (meth)acrylamides and aryl halide adducts such as benzyl chloride adducts of dialkyl (meth) acrylamides.

The anionic monomer includes (meth) acrylic acid and alkali metal salts such as sodium salt or ammonium salts of (meth) acrylic acid; maleic acid and the like and alkali metal salts thereof; acrylamidealkylalkane sulfonic acids such as acrylamide-2-methylpropane sulfonic acid and alkali metal salts or ammonium salts thereof; and vinyl sulfonic acid and alkali metal salts or ammonium salt thereof.

The amphoteric polymers may further contain monomers other than the above described monomers, more specifically, nonionic monomers, as required. Examples of nonionic monomers include (meth)acrylamide; dialkylaminoalkyl (meth)acrylates such as dimethylaminoethyl (meth)acrylate; dialkylaminoalkyl (meth)acrylamides such as dialkylaminopropyl (meth)acrylamides; and styrene, acrylonitrile, vinyl acetate, alkyl (meth)acrylates, alkoxyalkyl (meth)acrylates, vinylpyridine, vinylimidazole, allylamines and the like. Among these, (meth)acrylamide is preferable.

Any of the monomers can be used each alone or in combination thereof.

Preferable combinations of monomers in the present invention include: (1) a copolymer comprising a tertiary salt or a quaternary salt of a dialkylaminoalkyl acrylate as the cationic monomer, an acrylic acid salt as the anionic monomer, and an acrylamide as the nonionic monomer; (2) a copolymer comprising a tertiary salt or a quaternary salt of a dialkylaminoalkyl methacrylate as the cationic monomer, an acrylic acid salt as the anionic monomer, and an acrylamide as the nonionic monomer; and (3) a copolymer comprising a tertiary salt or a quaternary salt of a dialkylaminoalkyl methacrylate and a tertiary salt or a quaternary salt of a dialkylaminoalkyl acrylate as the cationic monomers, an acrylic acid salt as the anionic monomer, and an acrylamide as the nonionic monomer.

In the present invention, the amphoteric polymers are the polymers each having a value of 10 to 120 mPa·s in terms of 0.5% salted viscosity which is an index of molecular weight, and it is preferable that when the polymers are used as amphoteric polymer flocculants described later, the value falls in the range of 15 to 90 mPa·s in order to attain a stable dewatering treatment.

The "0.5% salted viscosity" referred to in the present invention means a value obtained by dissolving an amphoteric polymer in a 4% sodium chloride aqueous solution to obtain a 0.5 wt % solution of the polymer, and subjecting it to measurement at 25° C. by use of a B type viscometer with a rotor No. 1 or 2 at 60 rpm.

Production methods of the amphoteric polymers are not particularly restricted, but can adopt general polymerization methods. For example, in case of aqueous solution polymerization, a method can be adopted in which thermal radical polymerization is effected using potassium persulfate, ammonium persulfate, 2,2'-azobis(2-amidinopropane) dihydrochloride, a redox polymerization initiator or the like as a polymerization initiator, and a photoradical polymerization based on UV irradiation can also be effected using benzoin type-and acetophenone type photopolymerization initiators. Further, in case of reversed phase emulsion polymerization, polymerization may be effected using water insoluble initiators such as azobisisobutyronitrile and benzoyl peroxide, in addition to an above described polymerization initiator.

The produced gel polymer is then cut and chopped by methods well known in the art. The chopped polymer is dried at a temperatures of the order of 60 to 150° C. by means of a dryer such as a band dryer, a rotary dryer, an far-infrared dryer and a vibration flow dryer, made into powdered polymer by means of a grinder or the like, and subjected to size control.

The composition of the present invention is a composition containing two or more types of amphoteric polymers differing in copolymerization ratio of cationic monomer units to anionic monomer units, and specifically comprises a first amphoteric polymer satisfying the following expression (1) in combination with a second amphoteric polymer satisfying the following expression (2) or a third amphoteric polymer satisfying the following expressions (3) and (4):

$$Ca_1/An_1 \geq 1 \tag{1}$$

$$Ca_2/An_2 < 1 \tag{2}$$

$$Ca_3/An_3 \geq 1 \tag{3}$$

$$|(Ca_1-An_1)-(Ca_3-An_3)| \geq 1.5 \tag{4}$$

wherein $Ca_1$ and $An_1$ respectively represent the total mole number of the cationic monomer units and the total mole number of the anionic monomer units in the first amphoteric polymer on a condition that the total mole number of all the constituent monomer units in the first amphoteric polymer is converted to be 100 mol; on a condition similar to the above, $Ca_2$ and $An_2$ respectively represent the total mole number of the cationic monomer units and the total mole number of the anionic monomer units in the second amphoteric polymer; and on a condition similar to the above, $Ca_3$ and $An_3$ respectively represent the total mole number of the cationic monomer units and the total mole number of the anionic monomer units in the third amphoteric polymer.

According to a preferred embodiment of the present invention, the first amphoteric polymer which is cationic-rich and the second amphoteric polymer which is anionic-rich are used in combination as amphoteric polymers. In this case, the first amphoteric polymer is preferably one in which $Ca_1/An_1$ is 1.5 to 10.0, and the second amphoteric polymer is preferably one in which $Ca_2/An_2$ is 0.5 to 0.9.

According to another preferred embodiment of the present invention, two types of cationic-rich polymers, namely, the first amphoteric polymer and the third amphoteric polymer, are used in combination; in other words, amphoteric polymers are used in combination, which are respectively large and small in difference between the amount of anionic constituent monomer units and the amount of cationic constituent monomer units. In this case, it is preferable that proportion of nonionic monomer units to all the constituent monomer units in all the amphoteric polymers of the composition is 60 mol % or more, that is, the ionic monomer units constitute less than 40 mol % of the polymers. In this embodiment, it is preferable that $Ca_1/An_1$ is 1.2 to 40.0 and $Ca_3/An_3$ is 1.2 to 40.0. It is preferable that $|(Ca_1-An_1)-(Ca_3-An_3)|$ is 1.5 to 40.0. If this value is smaller than 1.5, flocculation performance as contemplated by the present invention cannot be attained when the composition is used as a flocculant. If the proportion of nonionic monomer units is smaller than 60 mol % in relation to the total constituent monomer units in the amphoteric polymers in the composition, flocculability is sometimes lowered when the composition is used as a flocculant.

The above described first, second and third amphoteric polymers can be obtained by copolymerization of cationic monomer units, anionic monomer units and optionally nonionic monomer units in such a way that the above described monomer unit ratios are satisfied.

The composition of the present invention can be produced by mixing the first amphoteric polymer with the second amphoteric polymer or the third amphoteric polymer. Alternatively, in the below described dewatering of sludge or papermaking process, each of the components can be added separately.

For each of the first, second and third amphoteric polymers, either one type or two or more types can be used in combination, however it is convenient and preferable to use one type for each of the above described first, second and third amphoteric polymers.

Proportion of each of the amphoteric polymers in the composition can be appropriately set according to purposes; when the first amphoteric polymer and the second amphoteric polymer are used in combination, it is preferable that the first amphoteric polymer is used in the range of 20 to 60% by mass and the second amphoteric polymer is used in the range of 40 to 80% by mass; and when the first amphoteric polymer and the third amphoteric polymer are used in combination, it is preferable that the first amphoteric polymers is used in the range of 10 to 90% by mass and the third amphoteric polymers is used in the range of 90 to 10% by mass.

2. Uses

The composition of the present invention can be applied to various uses. Examples of the application include polymer flocculants, and thickeners for use in coating compositions and the like. Examples of the polymer flocculants include sludge dewatering agents, agents for papermaking such as retention aids used in the papermaking process, and the like.

The composition obtained in the present invention is useful as a polymer flocculant, in particular, as a sludge dewatering agent and a retention aid. Description will be made below on the sludge dewatering agent and the retention aid.

1) Sludge Dewatering Agent and Sludge Dewatering Method

When the sludge dewatering agent of the present invention (hereinafter, sometimes referred to as an amphoteric polymer flocculant) is used, it may be mixed with additives well known in the art including sodium hydrogen sulfate, sodium sulfate, sulfamic acid and the like as far as no adverse effect takes place.

The sludge dewatering agent of the present invention can be applied to various types of sludge such as sludge of organic nature, and mixed sludge including flocculated and sedimented sludge and the like derived from sewage, human waste and general industry waste water such as food industry, chemical industry, and pulp or papermaking industry sludge.

Particularly, the sludge dewatering agent of the present invention can be preferably applied to sludge small in fibrous content, namely, sludge high in ratio of excess sludge. Specifically, the sludge dewatering agent of the present invention can be preferably applied to sludge of 5 SS % or more in terms of ratio of excess sludge, and more preferably to sludge of 5 to 80 SS % in terms of ratio of excess sludge. The mode in which the first amphoteric polymer and the second amphoteric polymer are used in combination is suitable for application to sludge of 20 SS % or more in terms of ratio of excess sludge, preferably to sludge of 20 to 80 SS % in terms of ratio of excess sludge. Additionally, the mode in which the first amphoteric polymer and the third amphoteric polymer are used in combination is suitable for application to sludge of 5 SS % or more in terms of ratio of excess sludge, preferably to sludge of 5 to 40 SS % in terms of ratio of excess sludge.

The present dewatering method using the sludge dewatering agent is concretely a method in which a sludge dewatering agent is added to sludge so as to form sludge flocs. The floc formation method can follow the methods well known in the art.

If necessary, inorganic flocculants, organic cationic compounds, cationic polymer flocculants and anionic polymer flocculants can additionally be used.

Examples of the inorganic flocculants include aluminum sulfate, aluminum polychloride, ferric chloride, ferrous sulfate, iron polysulfate and the like.

Examples of the organic cationic compounds include polymer polyamine, polyamidine, cationic surfactants and the like.

In the case where inorganic flocculants or organic cationic compounds are added, it is preferable to adjust the pH to be 4 to 8 since sludge can be treated effectively.

As for the pH adjustment method, no particular pH adjustment is needed when an appropriate pH value is obtained after inorganic flocculants or organic cationic compounds are added; however, when the pH range prescribed in the present invention is not satisfied, an acid or an alkali can be added for adjustment.

Examples of the acids include hydrochloric acid, sulfuric acid, acetic acid, sulfamic acid and the like. Additionally, examples of such alkalis include caustic soda, caustic potash, calcium hydroxide, ammonia and the like.

Examples of the cationic polymer flocculants include homopolymers of the above described cationic monomers, copolymers of the above described cationic monomers and nonionic monomers, and the like.

Examples of the anionic polymer flocculants include homopolymers of the above described anionic monomers, copolymers of the above described anionic monomers and nonionic monomers, and the like.

In the present invention, when sludge low in fibrous content, namely, sludge high in ratio of excess sludge is used, it is preferable to use an anionic polymer flocculant as well.

In this case, as for the method for adding these polymer flocculants to the sludge, they may be added either separately or concurrently; however, it is preferable to add the amphoteric polymer flocculant after the anionic polymer flocculant has been added because the effect of the combined use of these polymer flocculants becomes largest.

In the case where the first and second amphoteric polymers are used in combination, the anionic polymer flocculant involved may be a copolymer containing the anionic monomer unit of preferably 30 mol % or more, more preferably 40 mol % or more in copolymerization ratio.

In the case where the first and third amphoteric polymers are used in combination, the anionic polymer flocculant involved may be a copolymer containing the anionic monomer unit of preferably 5 mol % or more in copolymerization ratio.

In both cases, the combination ratio of the anionic polymer flocculant and amphoteric polymer flocculant is preferably such that the content of the anionic polymer flocculant is 1 to 70 mass % and the content of the amphoteric flocculant is 99 to 30 mass % in relation to the total amount of all the polymer flocculants.

Additionally, it is preferable that flocculants are added to sludge in such a way that the ratio of the total sum of the cationic monomer units to the total sum of the anionic monomer units in all the polymer flocculants satisfies the following expression (5).

$$0.3 \leq Ca_{all}/An_{all} \leq 10 \tag{5}$$

In the above expression (5), $Ca_{all}$ and $An_{all}$ respectively represent the total mole number of all the cationic monomer units and the total mole number of all the anionic monomer units on a condition that the sum of the total amount of all the cationic monomer units and the total amount of all the anionic monomer units, in all the polymer flocculants, is converted to be 100 mol.

Outside this range, the flocculationability sometimes becomes poor, the required amounts of all the flocculants are extraordinarily increased, and the moisture contents of the finally-obtained cakes become high.

In the case where the first amphoteric polymer and the second amphoteric polymer are used in combination, it is further preferable that the addition is made so that the above described ratio satisfies the following expression (5-1).

$$0.3 \leq Ca_{all}/An_{all} \leq 4.0 \tag{5-1}$$

In the above expression (5-1), $Ca_{all}$ and $An_{all}$ are the same as those in the above expression (5).

In the case where the first amphoteric polymer and the third amphoteric polymer are used in combination, it is further preferable that the addition is made so that the above described ratio satisfies the following expression (5-2).

$$0.5 \leq Ca_{all}/An_{all} \leq 10.0 \tag{5-2}$$

In the above expression (5-2), $Ca_{all}$ and $An_{all}$ are the same as those in the above expression (5).

Addition amounts of the amphoteric polymer flocculants and other flocculants, stirring speed, stirring time and the like are recommended to follow the dewatering conditions employed in the prior art.

In both cases where the first and second amphoteric polymers are used in combination and where the first and third amphoteric polymers are used in combination, proportion of the amphoteric polymer flocculants is preferably 5 to 500 ppm in relation to the sludge amount, and is 0.05 to 1 mass % in relation to SS. When amphoteric polymer flocculants and other polymer flocculants are used in combination, it is preferable that the total amount of all the polymer flocculants satisfies the above described proportion.

The flocs thus formed are dewatered by procedures well known in the art to form dewatered cakes.

Examples of the dewatering machines include a screw press dewatering machine, a belt press dewatering machine, a filter press dewatering machine, a screw decanter and the like.

Additionally, the sludge dewatering agent of the present invention can be applied to a dewatering method which uses a vessel for granulation and concentration having a filtering part.

Specifically, examples of the dewatering methods include a method in which an inorganic flocculant is added to sludge, then, either after a sludge dewatering agent has been further added or together with the sludge dewatering agent, the sludge is introduced into the vessel for granulation and concentration having the filtering part, the filtrate is taken out from the filtering part while the granulation is made concurrently, and the granulated matter is subjected to dewatering by means of a dewatering machine.

2) Retention Aids and Papermaking Methods

In the case where the composition of the present invention is used as a retention aid, the amphoteric polymers as raw materials for the composition are preferably powder. In actual use, the amphoteric polymers as raw materials are dissolved in water, and used as an aqueous solution of preferably 0.01 to 0.5 mass %, more preferably 0.01 to 0.1 mass %.

As a retention aid, a composition is preferable in which the first and second amphoteric polymers are contained in combination.

The method for using the retention aid can adopt a conventional method in such a way that, for example, the aid is added when the stuff is diluted to the final concentration for charging into the papermaking machine or added after the dilution.

Stuffs to which the retention aid is applied include those that have been used in the usual papermaking process, and usually contain pulp and filler, and optionally other additives specifically including sizing agents, fixers, paper strength agents, colorants and the like.

Examples of the fillers include clay, kaoline, agalite, talc, calcium carbonate, magnesium carbonate, sulfate of lime, barium sulfate, zinc oxide, titanium oxide and the like. Examples of the sizing agents include acrylic acid-styrene copolymers and the like; examples of the fixers include aluminum sulfate, cationic starch, alkylketene dimer and the like; and examples of the paper strength agents include starch, cationic or amphoteric polyacrylamide and the like.

As for the manner in which the retention aid is added, an aqueous solution of the composition can be added, or an aqueous solution of an amphoteric polymer as a raw material of the composition may be added followed by addition of an aqueous solution of another amphoteric polymer.

Proportion of the retention aid to be added is preferably 0.05 to 0.8 mass %, more preferably 0.05 to 0.5 mass % in relation to the dry pulp mass in the stuff.

It is preferable that the retention aid is added in such a way that the above described ratio between $Ca_{all}$ and $An_{all}$ satisfies the above described expression (5-1).

The pH value of the stuff after adding the retention aid is maintained to be preferably 5 to 10, more preferably 5 to 8. Immediately after the addition of the retention aid, the stuff is charged into the papermaking machine.

EXAMPLES

Hereinafter, the present invention will be more concretely explained with reference to examples and comparative examples.

In the following examples, the term "parts" means parts by mass.

The amphoteric polymers and anionic polymer flocculants used in the individual examples were respectively those in powdered form shown in Tables I-1 and I-2.

The abbreviations appearing in these tables denote as follows:

DAC: Methyl chloride quaternary salt of dimethylamino-ethyl acrylate
AA: Acrylic acid
AMD: Acrylamide

TABLE I-1

| Amphoteric polymer | Constituent monomer units (molar ratio) | Ca/An | 0.5% Salted viscosity (mPa · s) |
|---|---|---|---|
| CR-1 | DAC/AA/AMD (42/5/53) | 8.40 | 71 |
| CR-2 | DAC/AA/AMD (60/15/25) | 4.00 | 70 |
| CR-3 | DAC/AA/AMD (12/2/86) | 6.00 | 85 |
| CR-4 | DAC/AA/AMD (60/5/35) | 12.00 | 60 |
| AR-1 | DAC/AA/AMD (30/35/35) | 0.86 | 35 |
| CO-1 | DAC/AA/AMD (33/28/39) | 1.18 | 45 |
| CO-2 | DAC/AA/AMD (40/28/32) | 1.43 | 44 |
| CO-3 | DAC/AA/AMD (19/3/78) | 6.33 | 80 |

TABLE I-2

| Anionic polymer flocculant | Constituent monomer units (molar ratio) | 0.5% Salted viscosity (mPa · s) |
|---|---|---|
| AN-1 | AA (100) | 70 |
| AN-2 | AA/AMD (50/50) | 120 |

Example I-1

As amphoteric polymers, 25 parts of CR-1 and 75 parts of AR-1 were used and mixed together to produce a composition, which was used as an amphoteric polymer flocculant BL-1 (Table I-3).

Two hundred milliliters (200 ml) of a mixed sludge, which was composed of a scum waste water of a recycled wastepaper pulp waste water (SS: 33,400 mg/l, VSS: 16,900 mg/l, fibrous content: 290 mg/l) and an excess sludge (SS: 10,700 mg/l, VSS: 8,200 mg/l, fibrous content: 80 mg/l) in a mixing ratio of 55:45 (SS %), was sampled and placed in a 300 ml beaker, to which the amphoteric polymer flocculant was added. Then, the sludge was transferred into a 300 ml empty beaker, and this transfer was repeated 5 times in total. Thereafter, the suspension was stirred 50 times with a spatula to form flocs, and then flocculationability of the flocs was evaluated on the basis of the below described three grades, and the diameter of the obtained flocs was measured.

Thereafter, by using a piece of filter cloth of 80 mesh size as a filter, the above described sludge floc suspension was subjected to gravitational filtration, and volume of the filtrate after the elapsed time of 10 seconds was measured, which was taken as the filtration rate. Additionally, self-supportability of the cakes on the piece of filter cloth and appearance of the filtrate were respectively evaluated on the basis of the below described sets of three grades.

The obtained cake was sandwiched with punching metals of 4 mmϕ, a load of 6.5 kg×3 minutes was loaded, the weight of the cake that had escaped through the punching holes (punching leak) was weighed, and peelability of the cake in relation to the piece of filter cloth was evaluated on the basis of the below described three grades.

The evaluated results are shown in Table I-4. The sludge dewatering method of Example I-1 was found to be excellent in all the evaluated flocculation performances.

Flocculationability

Excellent: On stirring, flocs of large diameter were immediately formed.

Good: After stirring continued for a while, flocs of large granular diameter were formed.

Poor: Even after continued stirring, merely flocs of small diameter were formed.

Filtrate Appearance

Excellent: Completely transparent.

Good: A slight amount of suspended solid was found.

Poor: A large amount of suspended solid was found.

Self-Supportability

The floc suspension is poured into a cylindrical vessel when subjected to gravitational filtering, and after filtration the cylindrical vessel is removed, and evaluation was made.

Excellent: The cake stood completely by itself.

Good: The cake collapsed slightly.

Poor: The cake collapsed completely.

Peelability

The cake was peeled off from the piece of filter cloth, and condition of the piece of filter cloth was observed.

Excellent: Absolutely not stained.

Good: Slightly stained.

Poor: Stained.

Examples I-2 to I-5

As amphoteric polymer flocculants, a flocculant BL-2 was also provided, which was produced in a manner similar to Example I-1 using amphoteric polymers shown in Table I-3.

Dewatering treatment of sludge was carried out in the same manner as that in Example I-1, except that an anionic polymer flocculant shown in Table I-4 was added to the sludge, and then an amphoteric polymer flocculant shown in Table I-4 was added thereto.

The results evaluated in the same manner as in Example I-1 are shown in Table I-4. The sludge dewatering methods of Examples I-2 to I-5 were all found to be excellent in all the evaluated flocculation performances.

TABLE I-3

| Amphoteric polymer flocculant | Amphoteric polymers (parts) | | Average ratio between the mixed constituent monomers (molar ratio) | $Ca/An$ after mixing |
|---|---|---|---|---|
| BL-1 | CR-1 (25) | AR-1 (75) | DAC/AA/AMD (33/28/39) | 1.18 |
| BL-2 | CR-2 (40) | AR-1 (60) | DAC/AA/AMD (40/28/32) | 1.43 |

Comparative Example I-1

Sludge dewatering treatment was carried out in the same manner as in Example I-1, except that an amphoteric polymer flocculant shown in Table I-5 was applied to the sludge.

The results evaluated in the same manner as in Example I-1 are shown in Table I-5.

The ratio between the constituent monomers in the amphoteric polymer flocculant CO-1 used in Comparative Example I-1 was the same as the ratio after mixing between the constituent monomers in the amphoteric polymer flocculant BL-1 used in Example I-1, but all the evaluated flocculation performances were found to be insufficient.

Comparative Examples I-2 and I-3

Sludge dewatering treatment was carried out in each of Comparative Examples I-2 and I-3 in the same manner as in Examples I-2 to I-5, except that an anionic polymer flocculant and an amphoteric polymer flocculant shown in Table I-5 were applied to the sludge.

The results evaluated in the same manner as in Example I-1 are shown in Table I-5.

The ratios between the constituent monomers in the amphoteric polymer flocculants CO-1 and CO-2 respectively used in Comparative Examples I-2 and I-3 were the same as the ratios after mixing between the constituent monomers in the amphoteric polymer flocculants BL-1 and BL-2 respectively, but all the evaluated flocculation performances were found to be insufficient.

TABLE I-4

| | Flocculants | | | | | | | | | |
| | Anionic | Amphoteric | | | Evaluated results | | | | | |
| Example | polymer flocculant (ppm) | polymer flocculant (ppm) | $Ca_{all}/An_{all}$ | Flocculationability | Floc diameter (mm) | Filtering rate | Filtrate appearance | Punching leak (g) | Self-supportability | Peel-ability |
|---|---|---|---|---|---|---|---|---|---|---|
| I-1 | 0 | BL-1 (180) | 1.18 | Good | 10–13 | 145 | Good | 0.3 | Good | Excellent |
| I-2 | AN-1 (7) | BL-1 (173) | 0.99 | Excellent | 10–20 | 165 | Good | 0.0 | Excellent | Excellent |
| I-3 | AN-2 (11) | BL-1 (169) | 1.01 | Excellent | 10–15 | 160 | Good | 0.0 | Excellent | Good |
| I-4 | AN-1 (15) | BL-2 (165) | 1.00 | Excellent | 8–15 | 155 | Good | 0.1 | Excellent | Good |
| I-5 | AN-2 (25) | BL-2 (155) | 1.00 | Excellent | 5–10 | 150 | Good | 0.2 | Excellent | Good |

TABLE I-5

| | Flocculants | | | | | | | | | |
| | Anionic | Amphoteric | | | Evaluated results | | | | | |
| Comparative example | polymer flocculant (ppm) | polymer flocculant (ppm) | $Ca_{all}/An_{all}$ | Flocculation-ability | Floc diameter (mm) | Filtering rate | Filtrate appearance | Punching leak (g) | Self-supportability | Peelability |
|---|---|---|---|---|---|---|---|---|---|---|
| I-1 | 0 | CO-1 (180) | 1.18 | Poor | 1–2 | 45 | Turbid | 4 | Good | Poor |
| I-2 | AN-1 (10) | CO-1 (170) | 1.00 | Poor | 1–2 | 80 | Turbid | 2 | Good | Poor |
| I-3 | AN-1 (16) | CO-2 (164) | 0.99 | Poor | 1–2 | 85 | Turbid | 3 | Good | Poor |

Example II-1

As amphoteric polymers, 30 parts of CR-1 and 70 parts of CR-3 were used and mixed together to produce a composition, which was used as an amphoteric polymer flocculant BL-3 (Table II-1).

Two hundred milliliters (200 ml) of a mixed sludge, which was composed of a papermaking/pulp waste water (SS: 47,900 mg/l, VSS: 29,000 mg/l, fibrous content: 8,500 mg/l) was sampled and placed in a 300 ml beaker, to which the amphoteric polymer flocculant was added. Then, the sludge was transferred into an empty 300 ml beaker, and this transfer was repeated 5 times in total. Thereafter, the suspension was stirred 50 times with a spatula to form flocs, and then flocculationability of the flocs was evaluated on the basis of the three grades in the same manner as in Example I-1, and the diameter of the obtained flocs was evaluated after the prescribed times of stirring.

Thereafter, by using a piece of filter cloth of 80 mesh size as a filter, the above described sludge floc suspension was subjected to gravitational filtration, and volume of the filtrate after the elapsed time of 10 seconds was measured, which was taken as the filtration rate. Additionally, self-supportability of the cakes on the piece of filter cloth, appearance of the filtrate, and peelability of the cake in relation to the piece of filter cloth were respectively evaluated on the basis of the sets of three grades in the same manner as in Example I-1.

The moisture content of the cake was obtained as follows: the obtained sludge flocs were placed on a piece of filter cloth and subjected to 3 stages of squeezing by means of a mini belt machine with a running speed of 0.5 m/min and a pressure of 0.5 kg/cm$^2$; then, the cake was heated at 105° C. for 12 hours, and the weight decrement of the cake thus obtained yielded the water content.

The evaluated results are shown in Table II-2. The sludge dewartering method of Example II-1 was found to be excellent in all the evaluated flocculation performances.

TABLE II-1

| Amphoteric polymer flocculant | Amphoteric polymers (parts) | Average ratio between the mixed constituent monomers (molar ratio) | $(Ca_1 - An_1) - (Ca_2 - An_2)$ | Nonionic monomer/ all monomers (mol %) | Ca/An after mixing |
|---|---|---|---|---|---|
| BL-3 | CR-1 (30)  CR-3 (70) | DAC/AA/AMD (19/3/78) | 27 | 78 | 6.3 |

TABLE II-2

| | Flocculants | | Evaluated results | | | | | | |
|---|---|---|---|---|---|---|---|---|---|
| Example | Amphoteric flocculant (ppm) | $Ca_{all}/An_{all}$ | Flocculationability | Floc diameter (mm) | Filtering rate | Filtrate appearance | Moisture content (%) | Self-supportability | Peelability |
| II-1 | BL-3 (60) | 6.33 | Good | 3–5 | 90 | Good | 61.1 | Good | Good |

Comparative Example II-1

Sludge dewatering treatment was carried out in the same manner as in Example II-1, except that an amphoteric polymer flocculant shown in Table II-3 was applied to the sludge.

The results evaluated in the same manner as in Example II-1 are shown in Table II-3.

The ratio between the constituent monomers in the amphoteric polymer flocculant CO-3 used in Comparative Example II-1 was the same as the ratio after mixing between the constituent monomers in the amphoteric polymer flocculant BL-3 used in Example II-1, but all the evaluated flocculation performances were found to be insufficient.

TABLE II-3

| Comparative example | Flocculants Amphoteric polymer flocculant (ppm) | $Ca_{all}/An_{all}$ | Flocculationability | Evaluated results Floc diameter (mm) | Filtering rate | Filtrate appearance | Moisture content (%) | Self-supportability | Peelability |
|---|---|---|---|---|---|---|---|---|---|
| II-1 | CO-3 (60) | 6.33 | Poor | 1–2 | 50 | Turbid | 63.1 | Good | Poor |

Examples III-1 and III-2

As a retention aid, an aqueous solution containing 0.05 mass % of a mixture composed of 70 parts of CR-1 and 30 parts of AR-1 was used. The retention aid was produced as follows: CR-1 and AR-1 were added to water under stirring, dissolved in 30 minutes after addition, and stirred further for 30 minutes. This is referred to as the retention aid BL-4 (Table III-1).

An aqueous solution containing 0.05 mass % of a mixture composed of 60 parts of CR-4 and 40 parts of AR-1 was produced in the same manner as described above. This is referred to as the retention aid BL-5 (Table III-1).

A 1 mass % pulp slurry of CSF=450 ml was prepared by disintegrating and beating LBKP sheets; while stirring at 1,000 rpm, the following components (1) to (5) were successively added to the slurry in the order of description, and the total retention was measured by means of the dynamic drainage jar method. The results obtained are shown in Table III-2. The final pH value of the pulp slurry was 7.2.

(1) Light calcium carbonate: 20 mass % (a proportion in relation to the pulp solid content in the pulp slurry, and hereinafter referred to as "in relation to pulp")

(2) Cationic starch: 0.3 mass % (in relation to pulp)

(3) Aluminum sulfate: 1.7 mass % (in relation to pulp)

(4) Paper strength agent (a 15 mass % aqueous solution of a copolymer made of DAC/AA/AM=20/10/70 (molar ratio) Viscosity: 3,500 mpa·s): 0.5 mass % (in relation to pulp)

(5) Retention-aid: 250 ppm (solid content, in relation to pulp)

Example III-3

Performances of a retention aid were evaluated in the same manner as in Example III-1, except that as the retention aid, a 0.05 mass % aqueous solution of the amphoteric polymer AR-1 was added in 70 ppm (solid content, in relation to pulp), and then 0.05 mass % aqueous solution of the amphoteric polymer CR-1 was added in 175 ppm (solid content, in relation to pulp). The results obtained are shown in Table III-2.

Comparative Example III-1

As a retention aid, an aqueous solution was used which contains a 0.05 mass % of a cationic acrylic polymer (a copolymer of DAC:AM=10/90 (molar ratio), 0.5% salted viscosity=70 mPa·s, paste form product). The retention aid was produced as follows: the cation A was added to water under stirring, and it took 180 minutes to completely dissolve the cation A. This is referred to as the retention aid cation A.

Performances of the retention aid were evaluated in the same manner as in Example III-1, except that the cation A was used in 250 ppm (solid content, in relation to pulp). The results obtained are shown in Table III-2.

TABLE III-1

| Retention aid | Amphoteric polymers (parts) | | Average ratio between the mixed constituent monomers (molar ratio) | Ca/An after mixing |
|---|---|---|---|---|
| BL-4 | CR-1 (70) | AR-1 (30) | DAC/AA/AMD (38/15/47) | 2.57 |
| BL-5 | CR-4 (60) | AR-1 (40) | DAC/AA/AMD (46/19/35) | 2.39 |

TABLE III-2

| | Retention aid (ppm) | | | | | |
|---|---|---|---|---|---|---|
| | First addition | | | | Second addition | Total |
| | BL-4 | BL-5 | AR-1 | Cation A | CR-1 | retention (%) |
| Example III-1 | 250 | — | — | — | — | 86.6 |
| Example III-2 | — | 250 | — | — | — | 87.1 |
| Example III-3 | — | — | 75 | — | 175 | 87.2 |
| Comparative example III-1 | — | — | — | 250 | — | 84.1 |

INDUSTRIAL APPLICABILITY

When the composition of the present invention is used as an amphoteric polymer flocculant, the composition is excellent in various flocculation and dewatering performances in such a way that the filtration rate is fast for various types of sludge, in particular, for sludge high in ratio of excess sludge, and the obtained flocs are large in diameter and excellent in self-supportability and peelability. Additionally, the composition of the present invention, as a retention aid, can achieve process yield improvement in papermaking process.

The invention claimed is:

1. A composition which comprises amphoteric polymers comprising, as constituent monomer units, a cationic monomer unit, an anionic monomer unit, and optionally a nonionic monomer unit and having a 0.5% salted viscosity of 10 to 120 mPa·s, wherein said amphoteric polymers comprise a first amphoteric polymer satisfying the following expression (1), and a second amphoteric polymer satisfying the following expression (2) or a third amphoteric polymer satisfying the following expressions (3) and (4):

$$Ca_1/An_1 \geq 1 \quad (1)$$

$$Ca_2/An_2 < 1 \quad (2)$$

$$Ca_3/An_3 \geq 1 \quad (3)$$

$$|(Ca_1-An_1)-(Ca_3-An_3)| \geq 1.5 \quad (4)$$

wherein $Ca_1$ and $An_1$ respectively represent the total mole number of the cationic monomer units and the total mole number of the anionic monomer units in the first amphoteric polymer on a condition that the total mole number of all the constituent monomer units in the first amphoteric polymer is converted to be 100 mol; on a condition similar to the above, $Ca_2$ and $An_2$ respectively represent the total mole number of the cationic monomer units and the total mole number of the anionic monomer units in the second amphoteric polymer; and on a condition similar to the above, $Ca_3$ and $An_3$ respectively represent the total mole number of the cationic monomer units and the total mole number of the anionic monomer units in the third amphoteric polymer, wherein said cationic monomer unit is selected from the group consisting of tertiary salts of dialkylaminoalkyl (meth)acrylates, quaternary salts of dialkylaminoalkyl (meth)acrylates, tertiary salts of dialkyl (meth)acrylamides, and quaternary salts of dialkyl (meth)acrylamides.

2. A composition according to claim 1, comprising, as amphoteric polymers, the first amphoteric polymer and the second amphoteric polymer.

3. A retention aid for use in papermaking, comprising the composition according to claim 2.

4. A composition according to claim 1, comprising, as amphoteric polymers, the first amphoteric polymer and the third amphoteric polymer, wherein said amphoteric polymers each contains a cationic monomer unit, an anionic monomer unit and a nonionic monomer unit as indispensable constituent monomer units, and proportion of the nonionic monomer units to all the constituent monomer units in all the amphoteric polymers of the composition is 60 mol % or more.

5. An amphoteric polymer flocculant comprising the composition according to claim 1.

6. An amphoteric polymer flocculant according to claim 5, comprising, as amphoteric polymers, the first amphoteric polymer and the second amphoteric polymer.

7. An amphoteric polymer flocculant according to claim 5, comprising, as amphoteric polymers, the first amphoteric polymer and the third amphoteric polymer, wherein said amphoteric polymers each contains a cationic monomer unit, an anionic monomer unit and a nonionic monomer unit as indispensable constituent monomer units, and proportion of the nonionic monomer units to all the constituent monomer units in all the amphoteric polymers of the composition is 60 mol % or more.

* * * * *